United States Patent [19]

Oberhardt et al.

[11] Patent Number: 5,155,524
[45] Date of Patent: Oct. 13, 1992

[54] PHOTOGRAPHIC COPIER WITH MASKING DEVICE AND COPYING METHOD

[75] Inventors: Knut Oberhardt, Foeching; Wolfgang Zahn, Munich, both of Fed. Rep. of Germany

[73] Assignee: AGFA-Gevaert Aktiengesellschaft, Leverkusen, Fed. Rep. of Germany

[21] Appl. No.: 823,839

[22] Filed: Jan. 16, 1992

[30] Foreign Application Priority Data

Feb. 9, 1991 [DE] Fed. Rep. of Germany ....... 4103995

[51] Int. Cl.⁵ .............................................. G03B 27/80
[52] U.S. Cl. ...................................... 355/68; 355/71; 355/77
[58] Field of Search ...................... 355/38, 68, 71, 77, 355/74; 358/76, 80

[56] References Cited

U.S. PATENT DOCUMENTS 4,239,385 12/1980 Hujer .................................. 355/71

FOREIGN PATENT DOCUMENTS 3141263 6/1983 Fed. Rep. of Germany .

*Primary Examiner*—Russell E. Adams
*Assistant Examiner*—D. Rutledge
*Attorney, Agent, or Firm*—Peter K. Kontler

[57] ABSTRACT

A photographic copier has an adjustable masking device for masking a master to be reproduced. To determine whether masking is required and, if so, the degree of masking, the density of the master is measured and is then forwarded to a logic circuit which can make the determination. In a first mode of operation, masked and unmasked images of the master are displayed side-by-side on a pair of monitors so that an operator can make adjustments to the mask calculated by the logic circuit. The operator here controls the copying cycle. In a second mode of operation, the copying cycle is automated and the logic circuit decides whether masking is required by calculating a degree of masking and comparing the degree of masking with a relatively low reference value set by the operator. The master is copied without a mask when the calculated degree of masking is less than the reference value. If a copy made by masking is unsatisfactory, the operator can adjust or deactivate the logic circuit and make a new copy. In a third mode of operation, the reference value set by the operator is high. When the calculated degree of masking exceeds the reference value, the logic circuit asks the operator to make a decision on masking. To this end, the logic circuit interrupts the automatic copying cycle and calculates a proposed mask which is then displayed for the operator.

10 Claims, 1 Drawing Sheet

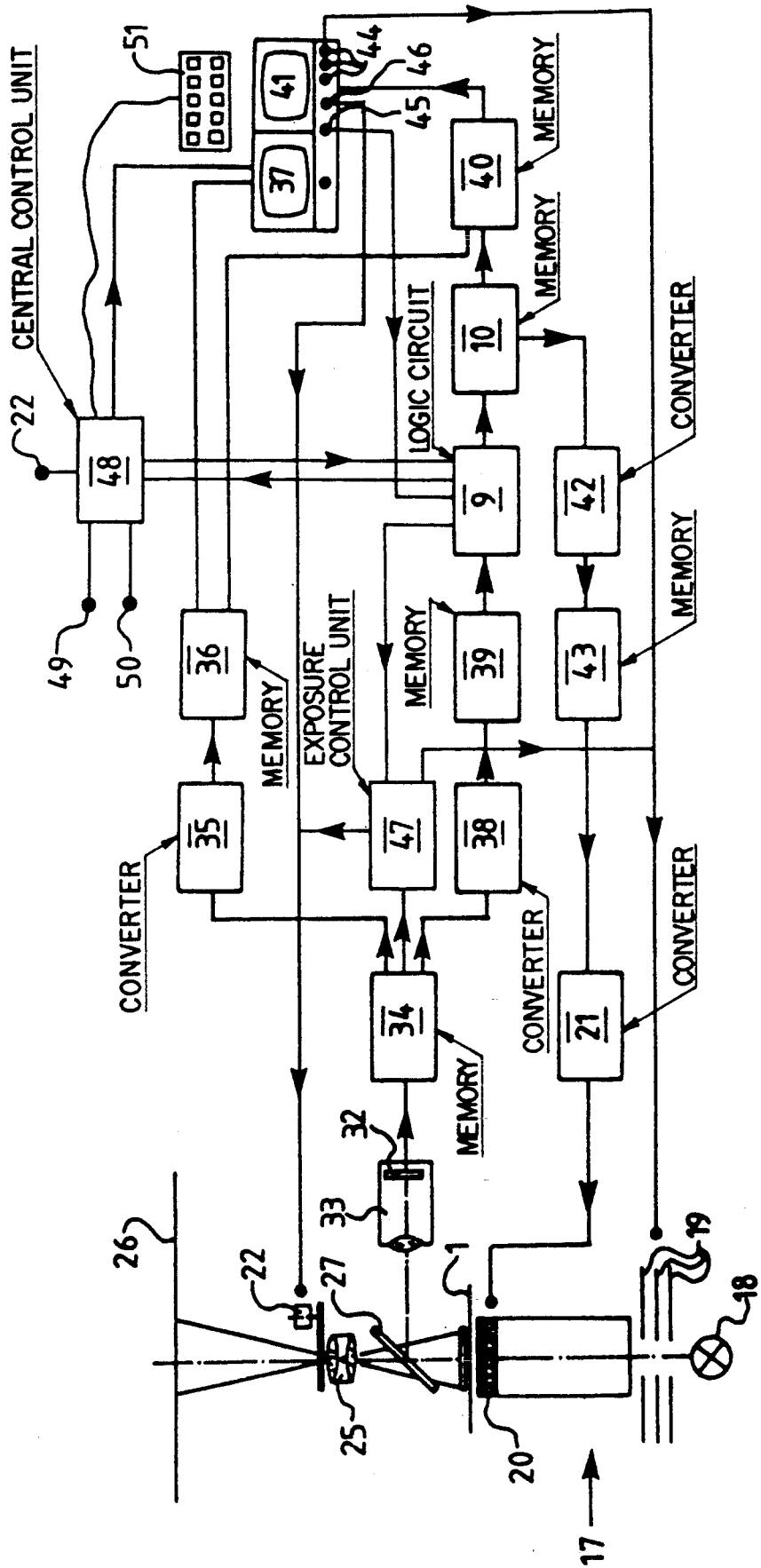

PHOTOGRAPHIC COPIER WITH MASKING DEVICE AND COPYING METHOD

BACKGROUND OF THE INVENTION

The invention relates generally to a copier and copying method.

More particularly, the invention relates to a photographic copier and a method of copying photographic masters. The copier has a device for masking the masters and a device for measuring the densities of the masters. A logic circuit utilizes the data from the measuring device to determine whether masking is required and, if so, the degree of masking.

Copies of photographs having large intensity variations in localized regions are often overexposed in the light areas and underexposed in the dark areas. As a result, details or fine structures are poorly reproduced, or not reproduced at all, on the paper image.

The German Offenlegungsschrift 31 41 263 discloses a method of copying color diapositives on reversal paper using masks to reduce contrast. The diapositive is placed in direct contact with phototropic glass which is then illuminated via the diapositive by means of an ultraviolet lamp or the like. A negative black-and-white mask of the diapositive is thereby produced in the phototropic glass. The composite of mask and diapositive is held in position and illuminated from the other direction to thus form an image of the diapositive on the reversal paper with low contrast. The Offenlegungsschrift describes how the method may be applied to a photographic copier for a large laboratory. To this end, a rotating endless band is provided and is equipped with elements of phototropic glass. After each copying operation, the band is advanced in such a manner that the next glass element is located in the path of the copy light.

Another photographic copier suitable for masking is disclosed in the German patent 28 20 965. Here, the mask is produced on an LCD matrix which is controlled by an electronic regulating circuit and is disposed between the illuminating system and the master.

In principle, both of the masking procedures outlined above can be applied in modern copiers of high capacity. However, it is then absolutely necessary for the copiers to be equipped with a logic circuit which decides whether a master should be masked and, if yes, to what degree. It has now been found that this is very difficult to achieve. For a better understanding as to why, two examples are briefly described below.

If an object or a person is photographed against the light, the object or person is black on a conventional copy while the background is normally illuminated or the background is greatly overexposed with contours of the object or person being detectable. For such photographs, the contrast between foreground and background can be sharply reduced by masking so that the contours of the foreground are visible even when the background is normally illuminated. The situation is entirely different when a photograph shows a black cat sitting in the snow. A logic circuit making a decision about masking based on the large-area contrast would mask this photograph also during the copying operation. The result would be a largely false reproduction. The white snow would certainly be somewhat dark while the black cat would be lighter and brownish. Such a reproduction is unsatisfactory to a photographer.

SUMMARY OF THE INVENTION

It is an object of the invention to provide a copier which allows copy quality to be improved.

Another object of the invention is to provide an automatic photographic copier which includes a masking device and enables qualitatively high-quality copies to be obtained.

A further object of the invention is to provide a copying method which permits copy quality to be improved.

An additional object of the invention is to provide a photographic copying method which employs masking and enables qualitatively high-quality copies to be obtained.

The preceding objects, as well as others which will become apparent as the description proceeds, are achieved by the invention.

One aspect of the invention resides in a copier, particularly a photographic copier. The copier comprises means for forming an image of a master or original on copy material; means for measuring the density of the master; adjustable means for masking the master; means for ascertaining, based on data from the measuring means, whether masking is to be performed, or the degree of masking, or both; and means for manually controlling the ascertaining means. The controlling means includes means for changing a determination made by the ascertaining means, means for deactivating the ascertaining means, or both.

The copier is preferably designed so that it is capable of operating automatically.

The ascertaining means may include a logic circuit while the controlling means may comprise an operator's console.

In spite of a high degree of automation, a person operating the copier is given the opportunity to correct the logic circuit in order to prevent falsification of images.

In a first exemplary embodiment, the copier processes orders fully automatically in a conventional manner. Masking is also performed completely automatically by the logic circuit. If, upon subsequent inspection, it is found that a master was improperly masked, the copier of the invention presents the operator with an opportunity to copy the master for a second time without masking. It is likewise possible to change the degree of masking when masking is excessive or insufficient. In the event that the operator recognizes, before insertion of a master in the copier, that such master will be improperly interpreted by the logic circuit, the latter can be deactivated prior to production of the first copy so that the master is copied without masking.

According to a further, preferred embodiment of the invention, the masters are normally unmasked during copying. However, the logic circuit here also calculates a degree of masking for each master. The calculated degree of masking is compared with a threshold or reference value, i.e., with a threshold or reference degree of masking. The calculated degree of masking can be used directly for this comparison or, alternatively, the large-area contrast of the master may be employed. The reference value can be selected based on the experience of the operator. If the reference value is exceeded, the logic circuit transfers a decision on masking to the operator. To this end, the copying cycle may be interrupted in that the actual copying operation is deferred and the operator is asked for a decision. Advantageously, the master is here projected onto a screen by means of a video camera. In order to facilitate the operator's decision, the logic circuit can submit a proposal, particularly as to the degree of masking.

Another aspect of the invention resides in a method of copying a master, particularly a photographic master. The method comprises the steps of measuring the density of the master; automatically ascertaining whether masking of the master is to be performed, or the degrees of masking, or both based on data from the measuring step; evaluating the results of the ascertaining step; manually changing the results when deemed appropriate upon evaluation; and forming an image of the master on copy material using the results of the ascertaining step or the changing step.

The ascertaining step may comprise calculating a degree of masking, and comparing the calculated masking degree with a reference or threshold masking degree. When the calculated masking degree is greater than the reference masking degree, the method further comprises the step of automatically soliciting the evaluating step.

The copying cycle may be automated, that is, the measuring, ascertaining and forming steps may be performed automatically. The soliciting step then advantageously includes inhibiting the forming step and displaying the master.

The method may additionally comprise the step of automatically proposing a degree of masking for the master when evaluation of the master is solicited.

The novel features which are considered as characteristic of the invention are set forth in particular in the appended claims. The improved copying method, as well as the construction and mode of operation of the improved copier, will, however, be best understood upon perusal of the following detailed description of certain specific embodiments when read in conjunction with the accompanying drawing.

BRIEF DESCRIPTION OF THE DRAWING

The single FIGURE is a block diagram of a photographic copier in accordance with the invention.

DESCRIPTION OF THE PREFERRED EMBODIMENTS

In the sole FIGURE, which illustrates a photographic copier according to the invention, the reference numeral 1 identifies a film. The reference numeral 17 indicates a printing or copying station while the reference numeral 18 identifies a source of print or copy light. The film 1 has a negative, that is, a transparent photographic master or original, which is positioned in the copying station 17.

Light from the light source 18 passes through an adjustable LCD mask matrix or masking device 20 and then through the master. At this time, the mask matrix 20 is transparent. Beyond the master, the light is reflected by a pivotable reflector 27 onto a flat, color CCD 32 of a video camera 33. The CCD 32 constitutes a means for measuring the density of the master. A negative color image of the master is formed on the CCD 32, and this negative color image is stored in a memory 34. The negative color image is reversed in a converter 35 to form a positive color image which is stored in a memory 36. The positive color image is displayed on a monitor 37.

The negative color image stored in the memory 34 is simultaneously transformed into a black-and-white image in a converter 38, and the black-and-white image is stored in a memory 39. A logic circuit 9 uses the black-and-white image in the memory 39 to calculate a negative black-and-white mask which is stored in a memory 10. The logic circuit 9 constitutes a means for ascertaining whether masking is to be performed and/or for ascertaining the degree of masking. A masked, positive color image of the master is now produced in a memory 40 from the negative black-and-white mask in the memory 10 and the positive color image in the memory 36. The masked, positive color image is exhibited on a monitor 41.

A converter 42 generates a positive black-and-white mask from the negative black-and-white mask in the memory 10, and the positive black-and-white mask is stored in a memory 43. The signals stored in the memory 43 and representing the positive black-and-white mask are converted to control signals for the LCD mask matrix 20 in a converter 21.

An operator can now directly compare the unmasked image of the master displayed on the monitor 37 with the mechanically or automatically derived masked image exhibited on the monitor 41. Color corrections may be made using three knobs 44 which act directly on a light mixing device 19 so that the color corrections are immediately visible on the two monitors 37 and 41. A knob 45 functions to correct masking. Corrections made via the knob 45 are sent to the logic circuit 9 where they change the degree of masking and such corrections can thus be immediately observed on the monitor 41. Another knob 46 on the monitor 41 serves to correct the density and regulates the time for which a shutter 22 opens during exposure.

When the operator considers the image on the monitor 41 to be optimal, an exposure can be made, that is, the actual operation of copying the master in the copying station 17 can be performed. For this purpose, the mask matrix 20 is first adjusted and the reflector 27 is pivoted out of the path of the copy light. The shutter 22 is opened and the master on the film 1, together with the mask, is copied on the copy paper 26 by means of the lens unit 25.

It is possible to eliminate the monitor 37 and to display only the masked positive image on a monitor. However, it has been found advantageous to compare the masked image with the unmasked image in order to facilitate the judgments of the operator on the effects of masking.

The mode of operation described above requires an operator who constantly observes the monitors 37 and 41. Very high image quality is obtained in this manner and such mode of operation is therefore particularly well-adapted for professional photography.

To make the copier suitable for the processing of orders from hobby photographers, the copying cycle must be automated, i.e., the operations of measuring the density of the master, ascertaining whether a mask is required and/or the degree of masking, and copying the master on the copy paper 26 must proceed automatically. For the actual copying operation, the negative color image in the memory 34 is then sent to an exposure control unit 47. In the exposure control unit 47, the amounts of copy light and the color corrections are calculated taking into account the degree of masking determined by the logic circuit 9.

Under these circumstances, when a film 1 is introduced into the non-illustrated stage or platform which is provided in the copier to support the masters, the leading master of the film 1 is positioned in the copying station 17. The density of this master is then measured as outlined above using the light source 18. In the logic circuit 9, the calculated degree of masking is here compared with a threshold or reference value, i.e., with a threshold or reference degree of masking, which can be entered in a central control unit 48 by the operator via a data entry station. The data entry station may, for example, include an operator's console or keyboard 51.

For a first copying mode, the predetermined reference value is relatively low so that the calculated degree of masking lies above the reference value for most of the masters. The decision as to whether the master should be masked is conveyed by the logic circuit 9 to the central control unit 48. When the decision is negative, the mask matrix 20 is adjusted in such a manner by the memories 10 and 43 and the converters 42 and 21 that it is completely transparent. The shutter 22 is thereupon actuated via the central control unit 48 and the exposure control unit 47. In the event that the decision as to whether the master should be masked is positive, the mask matrix 20 is adjusted to the calculated degree of masking. The shutter 22 is then activated as indicated above. After the copying operation, the central control unit 48 actuates a transporting device 50 for the film 1 so that the next master is positioned in the copying station 17. The central control unit 48 also activates a transporting device 49 for the copy paper 26 in order to position an unexposed segment of the copy paper 26 in the path of the copy light.

In this first copying mode, each copying cycle proceeds fully automatically so that no operator is required and the monitors 37 and 41 are redundant. If, upon final inspection, it is observed that masking of a master did not yield the desired result, the master in question can be recopied. The logic circuit 9 is then appropriately corrected by means of the keyboard 51 and the central control unit 48. The logic circuit 9 can also be deactivated entirely via the keyboard 51 and the central control unit 48 if the operator enters that no masking is desired.

The operator can select a second copying mode using the keyboard 51. In this case, a relatively high reference value is entered so that the logic circuit 9 renders a positive decision on masking for only a few masters. This means that a substantial number of the masters is copied without masking as in all conventional copiers. A positive decision on masking is rendered by the logic circuit 9 exclusively for those masters with very high contrast.

For such a master, the central control unit 48 interrupts the automatic copying cycle and asks the operator, e.g., by way of the monitor 37, to make a decision on masking. The logic circuit 9 simultaneously proposes a mask, or degree of masking, to the operator. The result of this proposal can be observed on the monitor 41. Consequently, an immediate determination can be made as to whether an improvement in quality or a reduction in quality is obtained. The operator's determination is transmitted to the central control unit 48 by means of the keyboard 51 and the central control unit 48 then initiates the copying operation in accordance with the operator's decision.

In this second copying mode, the monitors 37 and 41 are not required while the copying cycle proceeds automatically but only when a decision by the operator is desired.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the instant contribution to the art and, therefore, such adaptations should and are intended to be comprehended within the meaning and range of equivalence of the appended claims.

What is claimed is:

1. A copier, particularly a photographic copier, comprising means for forming an image of a master on copy material; means for measuring the density of the master; adjustable means for masking the master; means for ascertaining, based on data from said measuring means, whether masking is to be performed, or the degree of masking, or both; and means for manually controlling said ascertaining means, said controlling means including means for changing a determination made by said ascertaining means, means for deactivating said ascertaining means, or both.

2. The copier of claim 1, wherein said ascertaining means comprises a logic circuit.

3. The copier of claim 1, wherein said controlling means comprises an operator's console.

4. The copier of claim 1, wherein said ascertaining means comprises means for comparing an ascertained masking degree with a reference masking degree, means for activating said forming means while inhibiting said masking means when the ascertained masking degree is less than the reference masking degree, and means for soliciting manual judgment on masking, or masking degree, or both when the ascertained masking degree is greater than the reference masking degree.

5. The copier of claim 4, wherein said forming means, measuring means and ascertaining means are automated; and further comprising means for displaying an image of the master, said soliciting means including means for inhibiting said forming means, and means for exhibiting an image of the master on said displaying means.

6. The copier of claim 5, wherein said soliciting means comprises means for proposing a degree of masking.

7. A method of copying a master, particularly a photographic master, comprising the steps of measuring the density of said master; automatically ascertaining whether masking of said master is to be performed, or the degrees of masking, or both based on data from the measuring step; evaluating the results of the ascertaining step; manually changing said results when deemed appropriate upon evaluation; and forming an image of said master on copy material using the results of the ascertaining step or the changing step.

8. The method of claim 7, wherein the ascertaining step comprises calculating a degree of masking, and comparing the calculated masking degree with a reference masking degree; and further comprising the step of automatically soliciting the evaluating step when said calculated masking degree is greater than said reference masking degree.

9. The method of claim 8, wherein the measuring, ascertaining and forming steps are performed automatically, and the soliciting step includes inhibiting the forming step and displaying said master.

10. The method of claim 9, wherein the soliciting step comprises automatically proposing a degree of masking for said master.

* * * * *